United States Patent
Shi et al.

(10) Patent No.: US 11,670,904 B2
(45) Date of Patent: Jun. 6, 2023

(54) HIGH-PEAK-POWER SINGLE-FREQUENCY NARROW-LINEWIDTH NANOSECOND FIBER LASER BASED ON A TRIANGULAR PULSE

(71) Applicant: TIANJIN UNIVERSITY, Tianjin (CN)

(72) Inventors: Wei Shi, Tianjin (CN); Chaodu Shi, Tianjin (CN); Hao Tian, Tianjin (CN); Quan Sheng, Tianjin (CN); Jianquan Yao, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 17/367,264

(22) Filed: Jul. 2, 2021

(65) Prior Publication Data

US 2022/0181839 A1 Jun. 9, 2022

(30) Foreign Application Priority Data

Dec. 3, 2020 (CN) .......................... 202011409412.2

(51) Int. Cl.
*H01S 3/00* (2006.01)
*H01S 3/23* (2006.01)
(Continued)

(52) U.S. Cl.
CPC .......... *H01S 3/2308* (2013.01); *H01S 3/0085* (2013.01); *H01S 3/06716* (2013.01); *H01S 3/06733* (2013.01); *H01S 3/06754* (2013.01); *H01S 3/06758* (2013.01); *H01S 3/0941* (2013.01); *H01S 3/094065* (2013.01); *H01S 3/094069* (2013.01); *H01S 3/107* (2013.01); *H01S 3/1068* (2013.01); *H01S 3/11* (2013.01); *H01S 3/1618* (2013.01); *H01S 2301/08* (2013.01)

(58) Field of Classification Search
CPC ............ H01S 3/06758; H01S 3/06754; H01S 3/0085; H01S 2301/08
See application file for complete search history.

(56) References Cited

U.S. PATENT DOCUMENTS

2008/0219299 A1* 9/2008 Lewis ................. H01S 3/06758 372/6
2017/0155225 A1* 6/2017 Villeneuve ............ G01S 7/4817

OTHER PUBLICATIONS

Su, "High-peak-power temporally shaped nanosecond fiber laser immune to SPM-induced spectral broadening," 2019, High Power Laser Science and Engineering, vol. 7, e27, pp. 1-8. (Year: 2019).*

* cited by examiner

*Primary Examiner* — Michael Carter

(57) ABSTRACT

The present invention discloses a high-peak-power single-frequency narrow-linewidth nanosecond fiber laser based on a triangular pulse, wherein the laser includes: pulsed laser generated by the laser seed injecting into a first power pre-amplifier through a first isolator, and then injecting into a second pre-amplifier and then injecting into a power amplifier; wherein triangle-shaped pulsed laser with fast rising edge is obtained by using electro-optic and acousto-optic modulator to modulate continuous wave single-frequency laser or a single-frequency semiconductor laser directly modulated by radio frequency signal; single-frequency triangle-shaped pulsed laser is employed as the laser source according to the characteristics of narrow intrinsic linewidth and suppression of linewidth broadening caused by SPM, and the power of pulsed laser is amplified through the MOPA system.

5 Claims, 4 Drawing Sheets

(51) Int. Cl.
*H01S 3/067* (2006.01)
*H01S 3/094* (2006.01)
*H01S 3/0941* (2006.01)
*H01S 3/106* (2006.01)
*H01S 3/107* (2006.01)
*H01S 3/11* (2023.01)
*H01S 3/16* (2006.01)

HIGH-PEAK-POWER SINGLE-FREQUENCY NARROW-LINEWIDTH NANOSECOND FIBER LASER BASED ON A TRIANGULAR PULSE

TECHNICAL FIELD

The present invention belongs to the field of high-performance fiber laser, especially relates to a high-peak-power single-frequency narrow-linewidth nanosecond pulsed fiber laser based on triangular pulse.

BACKGROUND OF THE PRESENT INVENTION

All-fiber high-power narrow-linewidth single-frequency nanosecond pulsed fiber lasers have received considerable attentions, due to good stability, compactable and maintenance-free, particularly in LADAR and remote sensing, in which a narrow linewidth laser source can improve the performance of the whole system, therefore it is very important to study the narrow linewidth nanosecond pulsed fiber laser. One of the main factors limited the linewidth of nanosecond pulsed fiber lasers is the self-phase modulation (SPM), which leads to linewidth broadening as the peak power increases.

In general, imposing a phase shift conjugated to that induced by SPM can compensate the linewidth broadening to some extent. However, for high peak power pulsed lasers, the modulator usually can not provide sufficient phase shifting to compensate the strong SPM. In recent years, researchers revealed that SPM induced linewidth broadening is related to the derivative of the laser intensity with respect to time, therefore, the linewidth broadening will be suppressed by editing pulse shape.

SUMMARY OF THE PRESENT INVENTION

The present invention discloses a high-peak-power single-frequency narrow-linewidth nanosecond fiber laser based on triangular pulse, which employs triangular pulsed single-frequency laser as the laser source according to the narrow intrinsic linewidth and suppression of SPM of the triangular laser pulse, and the peak power of laser pulses is amplified through the master oscillator power amplifier (MOPA). The details are as follows.

A high-peak-power single-frequency narrow-linewidth nanosecond fiber laser based on triangular pulse, wherein the laser includes:

Single-frequency pulsed laser generated by the pulsed laser seed injects into the first power pre-amplifier through a first isolator, and then injects into the second power pre-amplifier and a power amplifier successively.

Wherein triangle-shaped pulsed laser with fast rising edge is obtained by using electro-optic intensity and acousto-optic modulator (EOIM and AOM) to modulate continuous wave (CW) single-frequency laser or a SF semiconductor laser directly modulated by radio frequency (RF) signal.

Single-frequency triangle-shaped pulsed laser is employed as the laser source according to the characteristics of narrow intrinsic linewidth and suppression of SPM, and the peak power of laser pulses is amplified through the MOPA.

Wherein, the first power pre-amplifier includes a first pumping source, a first combiner, a first double-clad active fiber, a first isolator, a first bandpass filter, and a second isolator connected in sequence.

Further, the second power pre-amplifier includes a second pumping source, a second combiner, a second double-clad active fiber, a second isolator, a second bandpass filter, and a third isolator connected in sequence.

Further, the power amplifier includes a third pumping source, a third combiner, a third double-clad active fiber, a third isolator, and an output collimator.

In practice, the pulsed laser seed generated through CW single-frequency laser modulated by EOM and AOM specifically including follows:

CW single-frequency fiber laser directly injects into an EOM through a fourth isolator, the EOM and AOM are modulated by RF signal generated by an arbitrary function generator (AFG).

The electro-optic intensity modulator is used to modulate the CW single-frequency laser into pulse sequence and edit the pulse repetition frequency (PRF), rising time, falling time, and full pulse width at half maximum (FWHM) of the triangle-shaped laser pulse.

The pulse sequence injects into the AOM after a first core pre-amplifier which is used to increase the peak power of these pulses and compensate losses introduced by the EOM and the AOM.

The AOM is synchronized with the EOM in the time domain, which is used to remove in-band amplified spontaneous emission and increase the extinction ratio.

In practice, the pulsed laser seed generated through directly modulating single-frequency semiconductor laser specifically including follows:

The single-frequency semiconductor laser outputs the triangle-shaped laser pulses with preset peak-power, PRF, rising time, falling time, and FWHM of the laser pulse, which is directly injected into a second core pre-amplifier through a fifth isolator, and then injected into a second AOM.

The second core pre-amplifier is used to boost the peak power of laser pulses and compensate the losses introduced by the AOM; the AOM is synchronized with the single-frequency semiconductor laser to remove CW components and in-band amplified spontaneous emission.

The beneficial effects of the technical scheme according to the present invention are:

1. The method of pulse shape editing employed in the present invention realizes the suppression of the self-phase modulation effect at the high-power level. This method not only avoids the complicated system of the phase compensation method, but also reduces the insertion loss in the system, which facilitates the amplification of the laser power; besides the laser linewidth obtained based on the triangular pulse is narrower than that of phase compensation.

2. Linewidth broadening caused by self-phase modulation can be suppressed effectively by using triangular pulse in the present invention, the output peak power reach to more than 20 kW.

3. The triangular pulses waveform in the present invention does not exhibit obvious distortion at high-power level, which ensures the stability of the laser linewidth.

4. The all-fiber MOPA configuration employed in the present invention is beneficial to the integration of laser systems and is convenient for industrialized production; the method of suppressing self-phase modulation effect adopted in the present invention is suitable for fiber lasers of various wavelengths.

5. Compared with the commonly used square-shaped pulse and Gaussian-shaped pulse, the triangle-shaped pulse used in the present invention not only presents narrow linewidth at high peak power, but also does not exhibit obvious pulse distortion; compared with the phase compensation method, the high-peak-power single-frequency narrow-linewidth pulsed laser has a simple structure, low insertion losses, which is benefit to realize stable operation of the high-power narrow-linewidth laser.

6. The present invention employs two stages of pre-amplifier and a power amplifier, which can be freely adjusted according to practical requirements with no limitation.

BRIEF DESCRIPTION OF THE DRAWINGS

FIGS. 1a-1c are schematics of a high-peak-power single-frequency narrow-linewidth nanosecond fiber laser based on a triangular pulse according to the present invention; wherein FIG. 1a shows a MOPA structure of the laser; FIG. 1b shows a pulsed laser seed based on CW single-frequency laser externally modulated by an EOM and an AOM; and FIG. 1c shows a pulsed laser seed based on directly modulating the single-frequency semiconductor laser;

FIGS. 2a-2d show output performances of a high-peak-power single-frequency narrow-linewidth nanosecond fiber laser; wherein FIG. 2a shows a schematic diagram of output power versus pump power; FIG. 2b shows a schematic diagram of pulse waveform at maximum output power; FIG. 2c shows a schematic diagram of laser linewidth at maximum output power; and FIG. 2d shows a schematic diagram of spectrum at maximum output power.

In which:

| | In which: |
|---|---|
| 1: | pulsed laser seed; |
| 2: | first isolator; |
| 3: | first pumping source; |
| 4: | first combiner; |
| 5: | first double-clad active fiber; |
| 6: | first cladding isolator; |
| 7: | first bandpass filter; |
| 8: | second isolator; |
| 9: | second pumping source; |
| 10. | second combiner; |
| 11: | second double-clad active fiber; |
| 12: | second cladding isolater; |
| 13: | second bandpass filter; |
| 14: | third isolator; |
| 15: | third pumping source; |
| 16: | third combiner; |
| 17: | third double-clad active fiber; |
| 18: | third cladding isolator; |
| 19: | output collimator; |
| 20: | CW single-frequency fiber laser; |
| 21: | fourth isolator; |
| 22: | arbitrary function generator (AFG); |
| 23: | electro-optic intensity modulator (EOIM); |
| 24: | first core pre-amplifier; |
| 25: | acousto-optic modulator (AOM); |
| 26: | single-frequency semiconductor laser; |
| 27: | fifth isolator; |
| 28: | second core pre-amplifier; |
| 29: | second acousto-optic modulator. |

DETAILED DESCRIPTION OF THE PRESENT INVENTION

To make the objectives, technical solutions, beneficial effects of the present invention clearer, the technical solutions in the embodiments of the present invention will be clearly and completely described below with reference to the drawings provided in the embodiments of the present invention.

It is to be noted that linewidth broadening caused by self-phase modulation with different pulse shapes have been demonstrated in previous works. Among them, the triangular pulse can suppress linewidth broadening caused by SPM efficiently, which provides the possibility to realize high-peak-power single-frequency narrow-linewidth pulsed fiber lasers. The following embodiments verified a high-peak-power single-frequency narrow-linewidth nanosecond fiber laser.

Embodiment 1

Figure 1A:
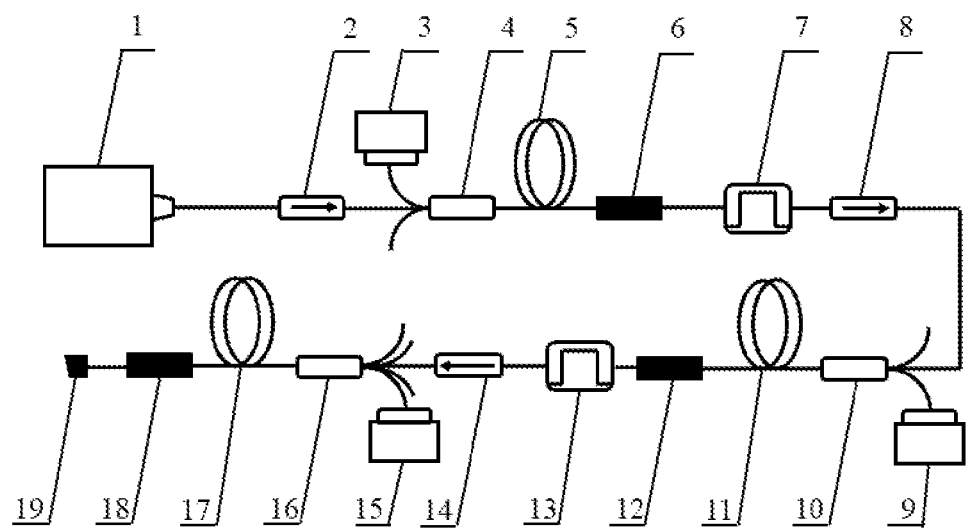

A high-peak-power single-frequency narrow-linewidth nanosecond fiber laser based on a triangular pulse, which adopted a MOPA structure with two stages of pre-amplifier and a power amplifier, as shown in FIG. 1(a), including: a pulsed laser seed 1, a first isolator 2, a first pumping source 3, a first combiner 4, a first double-clad active fiber 5, a first cladding isolator 6, a first bandpass filter 7, a second isolator 8, a second pumping source 9, a second combiner 10, a second double-clad active fiber 11, a second cladding isolator 12, a second bandpass filter 13, a third isolator 14, a third pumping source 15, a third combiner 16, a third double-clad active fiber 17, a third cladding isolator 18 and a collimator 19.

Wherein, the first pre-amplifier includes a first pumping source 3, a first combiner 4, a first double-clad active fiber 5, a first cladding isolator 6, a first band pass filter 7, and a second isolator 8; the second pre-amplifier includes a second pumping source 9, a second combiner 10, a second double-clad active fiber 11, a second cladding isolator 12, a second bandpass filter 13 and a third isolator 14; and the power amplifier includes a third pumping source 15, a third combiner 16, a third double-clad active fiber 17, a third cladding isolator 18 and an output collimator 19.

Figure 1B:
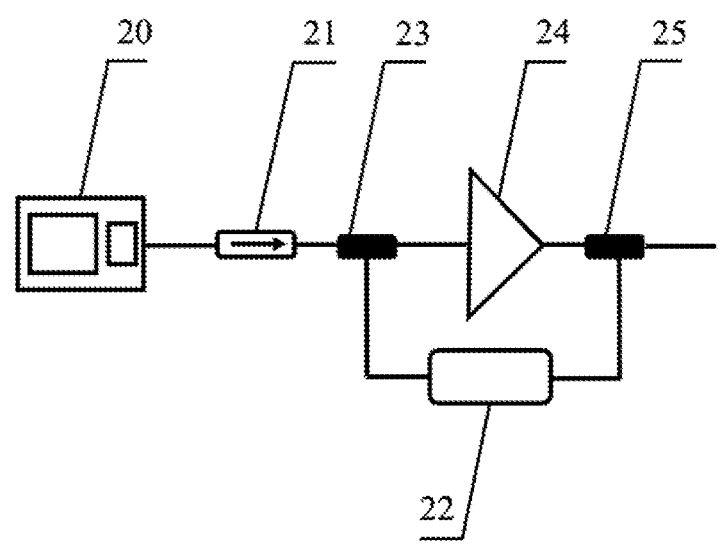

Wherein, the pulsed laser seed 1 was obtained by modulating the intensity of CW single-frequency laser, as shown in FIG. 1(b), including: CW single-frequency laser 20, fourth isolator 21, AFG 22, EOIM 23, first core pre-amplifier 24 and AOM 25.

Wherein, the CW single-frequency fiber laser 20 has center wavelength of 1064 nm, maximum output power of 70 mW and linewidth of 1 kHz, which was directly injected into the EOIM 23 through the fourth isolator 21, and the insertion loss of EOIM 23 is about 4 dB.

Wherein, the EOIM 23 and AOM 25 were controlled by radio frequency signal generated by the AFG 22.

Figure 2A:
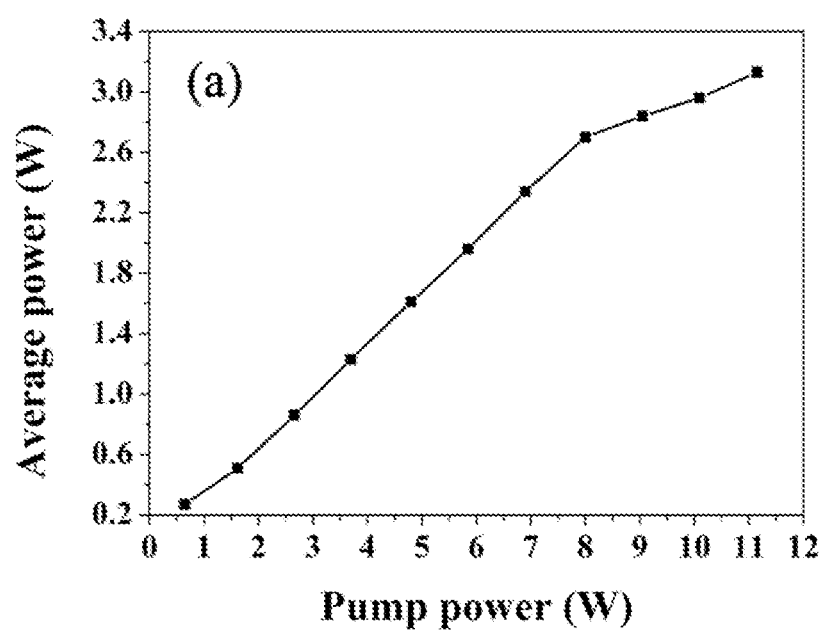
Figure 2B:
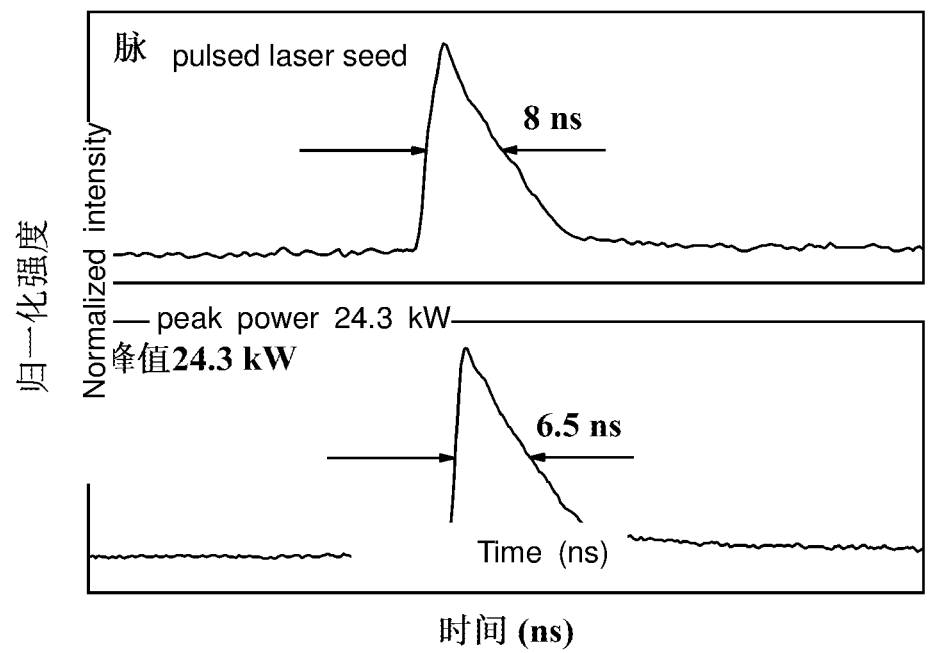

Wherein, the EOIM 23 was used to modulate the CW single-frequency laser into a triangular pulse sequence with a pulse repetition frequency (PRF) of 20 kHz, the rising time of triangle-shaped pulse is 1 ns and falling time of triangle-shaped pulse is 15 ns, the corresponding full width at half maximum of the laser pulse is 8 ns, as shown in FIG. 2(b).

Wherein, the obtained triangular wave pulse sequence was injected into the AOM 25 through the first core pre-amplifier 24.

Wherein, the first core pre-amplifier 24 was used to boost the peak power of the laser pulse and compensate the losses introduced by the EOIM 23 and the AOM 25.

Wherein, the AOM 25 is synchronized with the EOIM 23 in the time domain, which is used to further filter out continuous-wave components and in-band amplified spontaneous emission, a single-frequency pulsed laser seed with a peak power of 1.8 W was obtained.

Wherein, the pulsed laser seed was injected into the power pre-amplifier through the first isolator 2, the first pumping source 3 and the second pumping source 9 were 976 nm single-mode diodes, the first double-clad active fiber 5 and the second double-clad active fiber 11 were 2-meter Yb-doped fibers with core/inner cladding diameters of 10/130 and 20/130 μm, respectively, Each of the first bandpass filter 7 and the second bandpass filter 13 had a center wavelength of 1064 nm, a bandwidth of 2 nm, maximum power of 2 W, and insertion loss of 0.7 dB; the first isolator 2 had a center wavelength of 1064 nm, backward isolation of 50 dB, maximum power of 2 W, and insertion loss of 1 dB; each of the second isolator 8 and the third isolator 14 had a center wavelength of 1064 nm, backward isolation of 50 dB, maximum power of 10 W, and insertion loss of 0.5 dB.

The peak power of the pulsed laser was boosted to 1.86 kW after AOM, and then the pulsed laser seed was injected into the power amplifier. In the power amplifier, the third combiner 16 was a (6+1)×1 combiner, input and output fibers had core/inner cladding diameters of 20/125 and 30/250, respectively. The third pumping source 15 was a 976 nm multi-mode diode laser, and the third double-clad active fiber 17 was 1-meter Yb-doped fibers with core/inner cladding diameters of 30/250 μm; and the core/inner cladding diameter of the pigtail fiber of the output collimator 19 is 30/250, and the output laser spot diameter is 1 cm.

Figure 2C:
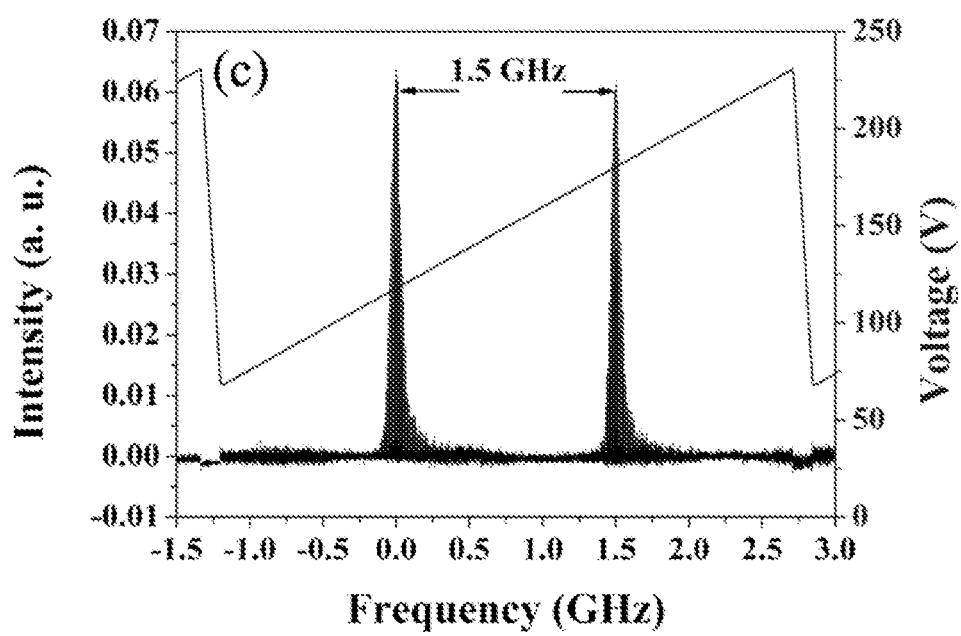
Figure 2D:
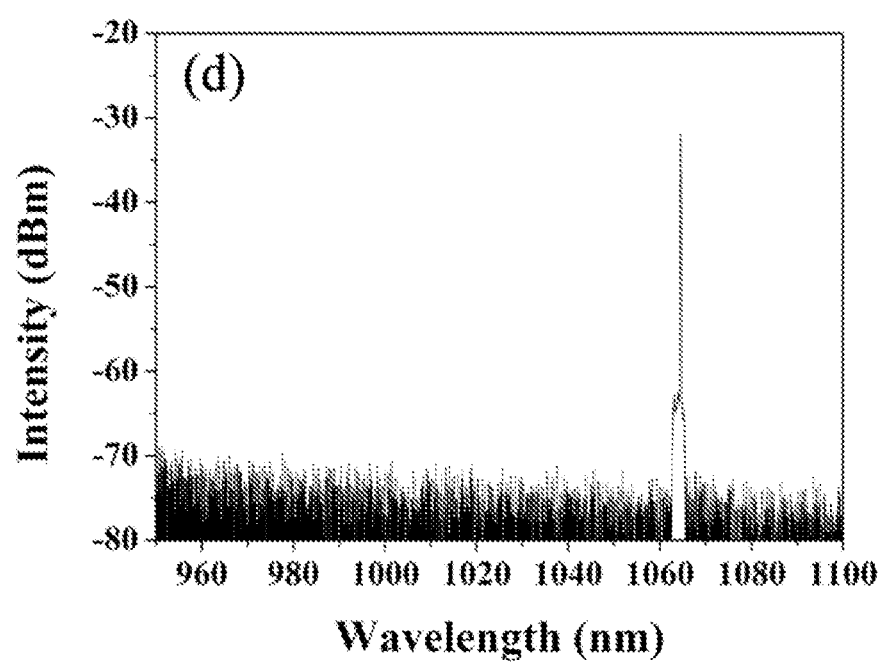

In the fiber laser of the present invention, the peak power of the pulsed laser was reached to 24.3 kW when the pump power was 10.3 W, as shown in FIG. 2(a); and the FWHM of output triangle-shaped pulse was 6.5 ns at maximum peak power, and the pulse shape was maintained triangle shape, as shown in FIG. 2(b); as shown in FIG. 2(c), the laser linewidth was 77 MHz, and no obvious self-phase modulation effect was observed; as shown in FIG. 2(d), the laser signal-to-noise ratio was more than 40 dB.

Consequently, the present invention realized well suppression of linewidth broadening caused by self-phase modulation effect, and distortion in output pulse waveform will not appear during amplification, so that the laser linewidth remained stable during the amplification.

Embodiment 2

A high-peak-power single-frequency narrow-linewidth nanosecond fiber laser based on a triangular pulse, which adopted a MOPA structure with two stages of pre-amplifier and a power amplifier, as shown in FIG. 1(a), including: a single-frequency pulsed laser seed 1, a first isolator 2, a first pumping source 3, a first combiner 4, a first double-clad active fiber 5, a first cladding isolator 6, a first bandpass filter 7, a second isolator 8, a second pumping source 9, a second combiner 10, a second double-clad active fiber 11, a second cladding isolator 12, a second bandpass filter 13, a third isolator 14, a third pumping source 15, a third combiner 16, a third double-clad active fiber 17, a third cladding isolator 18 and an output collimator 19.

Wherein, the first power pre-amplifier includes the first pumping source 3, the first combiner 4, the first double-clad active fiber 5, the first cladding isolator 6, the first bandpass filter 7 and the second isolator 8; the second power pre-amplifier includes the second pumping source 9, the second combiner 10, the second double-clad active fiber 11, the second double-clad isolator 12, the second bandpass filter 13 and the third isolator 14; and the power amplifier includes the third pumping source 15, the third combiner 16, the third double-clad active fiber 17, the third double-clad isolator 18 and the output collimator 19.

Figure 1C:
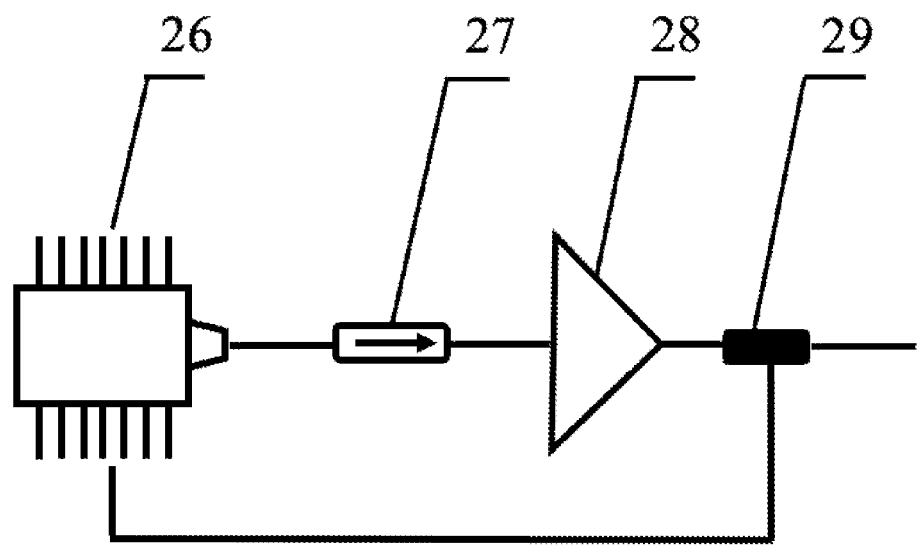

Wherein, the pulsed laser seed 1 was generated by a single-frequency semiconductor laser directly modulated by RF signal, as shown in FIG. 1(c), including: a single-frequency semiconductor laser 26, a fifth isolator 27, a second core pre-amplifier 28 and a second AOM 29.

Wherein, the single-frequency semiconductor laser 26 operated at 1064 nm and output a triangular pulse laser with peak power of 50 mW, PRF of 20 kHz, rising time of 1 ns, falling time of 15 ns, and the corresponding FWHM of the laser pulse of 8 ns, as shown in FIG. 2(b). Then the pulse sequence was directly injected into the second core pre-amplifier 28 through the fifth isolator 27, and then was injected into the second AOM 29.

The second core pre-amplifier 28 was used to increase the peak power of the laser pulse and compensate the loss introduced by the second AOM 29; the second AOM 29 was synchronized with the single-frequency semiconductor laser 26 to further filter out continuous-wave components and in-band amplified spontaneous emission to obtain a single-frequency pulsed laser seed with a peak power of 3.1 W.

Wherein, the pulsed laser seed obtained in the embodiment 2 was injected into the power pre-amplifier through the first isolator 2, the first pumping source 3 and second pumping source 9 were 976 nm single-mode diodes, the first double-clad active fiber 5 and the second double-clad active fiber 11 were 2-meter Yb-doped fibers with core/inner cladding diameters of 10/130 and 20/130 μm, respectively, Each of the first bandpass filter 7 and the second bandpass filter 13 had a center wavelength of 1064 nm, a bandwidth of 2 nm, peak power of 2 W, and insertion loss of 0.7 dB; the first isolator 2 had a center wavelength of 1064 nm, backward isolation of 50 dB, maximum power of 2 W, and insertion loss of 1 dB; each of the second isolator 8 and the third isolator 14 had a center wavelength of 1064 nm, backward isolation of 50 dB, maximum power of 10 W, and insertion loss of 0.5 dB.

The peak power of the pulsed laser was boosted to 1.86 kW after two pre-amplifiers, and then the pulsed laser was injected into the power amplifier. In the power amplifier, the third combiner 16 was a (6+1)×1 combiner, input and output fibers had core/inner cladding diameters of 20/125 and 30/250, respectively. The third pumping source 15 was a 976 nm multi-mode diode laser, and the third double-clad active fiber 17 was 1-meter Yb-doped fibers with core/inner cladding diameters of 30/250 μm; and the core/inner cladding diameter of the pigtail of the output collimator 19 is 30/250, and the output spot diameter thereof was 1 cm.

In the fiber laser of the present invention, the peak power of the pulsed laser was boosted to 24.3 kW when the pump power was 10.3 W, as shown in FIG. 2(a); and the FWHM of output laser pulse was 6.5 ns at maximum peak power, and the pulse shape was still triangle-shaped pulse, as shown in FIG. 2(b); it was shown in FIG. 2(c), the laser linewidth was 77 MHz, and no obvious self-phase modulation effect was observed; as shown in FIG. 2(d), the laser signal-to-noise ratio was greater than 40 dB.

Consequently, the present invention realized well suppression of the self-phase modulation effect without the phase compensation mechanism, and the output pulse waveform did not exhibit obvious distortion compared with the seed pulse, so that the laser linewidth remained stable during the amplification process.

In the embodiment of the present invention, the model of each device is not limited except for special instructions.

Those skilled in the art must understand that the accompanying drawings are only schematic diagrams of a preferred embodiment, and the serial numbers of the above-mentioned embodiments of the present invention are only for description, and do not represent the superiority or inferiority of the embodiments.

The foregoing embodiments and specific examples are merely for describing the technical solutions of the present invention and not intended to limit the present invention. Although the present invention has been described in details by the foregoing embodiments, it should be understood by a person of ordinary skill in the art that modifications may be made to the technical solutions recorded in the foregoing embodiments or equivalent replacements may be made to some or all of the technical features, and these modifications or replacements shall not make the essence of the corresponding technical solutions depart from the scope of the technical solutions of the embodiments of the present invention. Non-essential improvements and adjustments or replacements made according to the content of this specification by those skilled in the art shall fall into the protection scope of the present invention.

What is claimed is:

1. A high-peak-power single-frequency narrow-linewidth nanosecond fiber laser based on a triangular pulse, wherein the laser includes:
   pulsed laser generated by the laser seed injecting into a first power pre-amplifier through a first isolator, and then injecting into a second pre-amplifier and then injecting into a power amplifier;
   wherein triangle-shaped pulsed laser with fast rising edge is obtained by using electro-optic and acousto-optic modulator to modulate continuous wave single-frequency laser or a single-frequency semiconductor laser directly modulated by radio frequency signal;
   single-frequency triangle-shaped pulsed laser is employed as the laser source according to the characteristics of narrow intrinsic linewidth and suppression of linewidth broadening caused by SPM, and the power of pulsed laser is amplified through the MOPA system;
   wherein the pulsed laser seed generated through directly modulating single-frequency semiconductor laser comprises:
   the single-frequency semiconductor laser generates a triangle-shaped pulse sequence with preset peak-power, pulse repetition frequency, rising time, falling time, and corresponding FWHM of the laser pulse, which is directly injected into a second core pre-amplifier through a fifth isolator, and then injected into a second AOM; and
   the second core pre-amplifier is used to increase the peak power of the pulse sequence and compensate the losses introduced by the AOM; the AOM is synchronized with the single-frequency semiconductor laser to further filter out CW components and in-band amplified spontaneous emission to obtain a single-frequency pulse seed.

2. The high-peak-power single-frequency narrow-linewidth nanosecond pulsed fiber laser based on a triangular pulse according to claim 1, wherein the first power pre-amplifier includes a first pumping source, a first combiner, a first double-clad active fiber, a first cladding isolator, a first bandpass filter, and a second isolator connected in sequence.

3. The high-peak-power single-frequency narrow-linewidth nanosecond pulsed fiber laser based on a triangular pulse according to claim 1, wherein the second power pre-amplifier includes a second pumping source, a second combiner, a second double-clad active fiber, a second cladding isolator, a second bandpass filter, and a third isolator connected in sequence.

4. The high-peak-power single-frequency narrow-linewidth nanosecond pulsed fiber laser based on a triangular pulse according to claim 1, wherein the power amplifier includes a third pumping source, a third combiner, a third double-clad active fiber, a third cladding isolator and an output collimator.

5. The high-peak-power single-frequency narrow-linewidth nanosecond pulsed fiber laser based on a triangular pulse according to claim 1, wherein the pulsed laser seed generated through CW single-frequency laser modulated by EOM and AOM specifically including follows:
   CW single-frequency fiber laser directly injects into an EOIM through a fourth isolator, and the EOIM and the AOM are controlled by radio frequency signal generated by an arbitrary function generator;
   wherein the EOIM is used to modulate the CW single-frequency laser into triangular pulse sequence with preset pulse repetition frequency, rising time, falling time, and full width at half maximum of the laser pulse;
   the triangle-shaped pulse sequence injects into the AOM through a first core pre-amplifier; the first core pre-amplifier is used to increase the peak power of the laser pulses and compensate the insertion losses caused by the EOIM and the AOM;
   wherein, the AOM synchronized with the EOIM in the time domain is used to further filter out CW components and in-band amplified spontaneous emission to obtain a single-frequency pulsed laser seed.

* * * * *